UNITED STATES PATENT OFFICE.

EDWARD BEANES, OF 24 ARGYLL STREET, COUNTY OF MIDDLESEX, ENGLAND.

IMPROVEMENT IN TREATING ANIMAL CHARCOAL.

Specification forming part of Letters Patent No. 42,156, dated April 5, 1864.

*To all whom it may concern:*

Be it known that I, EDWARD BEANES, of No. 24 Argyll Street, in the county of Middlesex, in that part of the United Kingdom of Great Britain and Ireland known as England, have invented a new and useful Process for Improvements in the Preparing or Treating of Animal Charcoal; and I do hereby declare that the following is a full, clear, and exact description of the same.

I cause animal charcoal prepared in the usual manner and made perfectly dry to be thoroughly impregnated with dry hydrochloric-acid gas, and I allow the gas to remain in the charcoal until the lime, the carbonate of lime, or other salts of lime, and other alkaline and earthy matters which may be contained in the charcoal may be converted into soluble chlorides. I prefer to keep the charcoal hot during the time it is being and remains impregnated with the gas, in order to expel any water which may be formed in the charcoal during the process, which, if not got rid of, might cause the formation of liquid hydrochloric acid, which would act injuriously upon the charcoal. I then expel the excess of gas, as much as practical, by heat or by passing through the charcoal a current of hot or cold air, or by any other convenient means. I then dissolve out the chloride of calcium and other soluble chlorides. After being thoroughly washed, the charcoal is dried and is then fit for use.

Animal charcoal which has been used or has become deteriorated in its properties may be subjected to the same process; but I prefer that such charcoal should first be washed to remove its soluble impurities, then dried, and, after treatment with the hydrochloric-acid gas and the removal of the soluble chlorides, as above described, reburned.

Charcoal that has been used and reburned may also be submitted to the above process.

The object with which I apply dry hydrochloric-acid gas to the charcoal is to convert the lime and other earthy and alkaline matters in the charcoal into soluble salts without producing any important action upon the phosphate of lime contained in the charcoal, and I expel the excess of the gas remaining in the charcoal at the end of that process in the dry way before washing for the purpose of avoiding the production of liquid hydrochloric acid, which might injure the charcoal.

Hydrochloric-acid gas I believe to be the most convenient gas for effecting the object above named; but chlorine in a gaseous state may be used in a similar manner.

I claim as my invention and desire to secure by Letters Patent—

The employment of hydrochloric-acid gas and chlorine in a gaseous state in the preparation and treatment of animal charcoal, substantially as and for the purpose herein described.

EDWD. BEANES.

Witnesses:
GEORGE F. WARREN,
THOS. BROWN,
*Both of 17 Gracechurch Street, London, E. C.*
JOHN HARRISON,
*Notary Public, London.*